United States Patent [19]
Amand

[11] Patent Number: 4,939,935
[45] Date of Patent: Jul. 10, 1990

[54] PENDULAR NON-SERVOED TUNING BEAM ACCELEROMETER

[75] Inventor: Yvon Amand, Soisy Sous Montmorency, France

[73] Assignee: Societe d'Applications Generales d'Electricite et de Mecanique, Paris, France

[21] Appl. No.: 312,753

[22] Filed: Feb. 21, 1989

[30] Foreign Application Priority Data

Feb. 22, 1988 [FR] France .............................. 88 02079

[51] Int. Cl.$^5$ ............................................. G01P 15/10
[52] U.S. Cl. ........................... 73/517 AV; 73/DIG. 1
[58] Field of Search ..... 73/517 AV, DIG. 1, DIG. 4; 310/329

[56] References Cited

U.S. PATENT DOCUMENTS

| | | | |
|---|---|---|---|
| 4,244,225 | 1/1981 | Greenwood | 73/517 AV |
| 4,479,385 | 10/1984 | Koehler | 73/517 AV |
| 4,483,194 | 11/1984 | Rudolf | 73/517 R |
| 4,766,768 | 8/1988 | Norling | 73/517 AV |

FOREIGN PATENT DOCUMENTS 2162314 1/1986 United Kingdom .......... 73/517 AV

*Primary Examiner*—John Chapman
*Attorney, Agent, or Firm*—Larson & Taylor

[57] ABSTRACT

A low-cost pendular non-serviced accelerometer comprises a base, a pendular seismic mass connected to the base by a hinged connection for pivotal movement of the seismic mass about an axis along a sense direction perpendicular to the hinged connection and a sensor connecting the seismic mass to the base. The sensor comprises at least two vibrating beams of piezo-electric material, each connected to the base at an end thereof and to the seismic mass at the other end thereof, and each provided with electrodes for vibrating the respective beam at a tuning frequency thereof. The beams are directed orthogonally to the sense axis and are located symmetrically with respect to the seismic mass on both sides of the hinged connection, whereby any acceleration along the sense axis creates tractive stresses in one beam and compression stresses in the other beam. A circuit connected to the electrodes and is arranged for delivering a signal which is responsive to the difference between the resonant frequencies of the two beams when the seismic mass is subjected to an acceleration.

7 Claims, 4 Drawing Sheets

PENDULAR NON-SERVOED TUNING BEAM ACCELEROMETER

BACKGROUND OF THE INVENTION

1. Technical Field

The invention relates to non-servoed pendular tuning beam accelerometers of the type comprising a pendular seismic mass connected to a base by a hinged joint so that it can move freely in the direction of a sensitive axis and a resonant beam force sensor connecting the mass to the base and having electrodes for causing beam vibration.

2. Prior Art

Numerous accelerometers are already known comprising a pendular seismic mass and a force sensor formed as a beam connecting the mass to a base, the variations of the resonance frequency of the beam being a representation of the acceleration applied along the sensitive axis. In particular, such an accelerometer is known (US-A-4 517 841 assigned to Sundstrand Data Control) whose vibrating beam is so placed that the accelerations along the sensitive axis result in compression or tractive stresses in the beam placed parallel to this direction. An accelerometer is also known (Kass et al, Double-ended Tuning Fork Quartz Accelerometer, CH 2330-9/86/0000-0230, 1986, IEEE) in which a seismic mass is connected to a base solely by two beams which straddle it.

These accelerometers have the advantage of being robust and of moderate cost.

SUMMARY OF THE INVENTION

It is an object of the invention to provide an accelerometer which, while keeping and even reinforcing the above qualities, has an increased sensitivity, a reduced volume and a high resistance to accelerations greatly exceeding the measurement range and is of low cost. To this end, there is provided an accelerometer of the above-defined type, whose sensor comprises at least two vibrating beams fixed at one end to the base and perpendicular to the sensitive axis provided with electrodes for causing vibration at the resonance frequency, each beam being fixed to the mass at its end opposite the base so that application of an acceleration along the sensitive axis creates tractive stresses in the beam and compression stresses in the other.

The electrodes are connected to a circuit comprising an oscillator self-tunable to the resonance frequency of the beam and means for measuring the resonance frequencies or their difference. These means advantageously deliver a digital signal representing the frequency differential and so the acceleration.

The invention has numerous applications, particularly whenever it is desired to provide an accelerometer of small size, which can be mass produced at low price, which can deliver significant measurements in a considerable acceleration range and which withstands accelerations very much greater than the accelerations to be measured. Among the fields of use of such devices, mention may be made of guided or self-guided missiles and shells in which the accelerometer is used once only and in which an essential condition to fulfil is resistance to high accelerations undergone on firing; another field of use is the motorcar industry where the cost is a prevalent criteria.

Depending on the condition to be complied with as a priority, one or other of different possible embodiments may be adopted.

In a particular embodiment, two beams are placed each on one side of the mass in the direction of the sensitive axis, at a mutual distance along the direction of the sensitive axis which is very much less than the width and the length of the mass. That solution makes it possible to provide an extremely flat and small accelerometer.

In all cases, mechanical amplification may be obtained which is favorable to the sensitivity of the system.

BRIEF DESCRIPTION OF THE DRAWINGS

The invention will be better understood from the following description of particular embodiments, given by way of non-limitative examples. The description refers to the accompanying drawings, wherein.

DETAILED DESCRIPTION OF A PREFERRED EMBODIMENT

Figure 1:
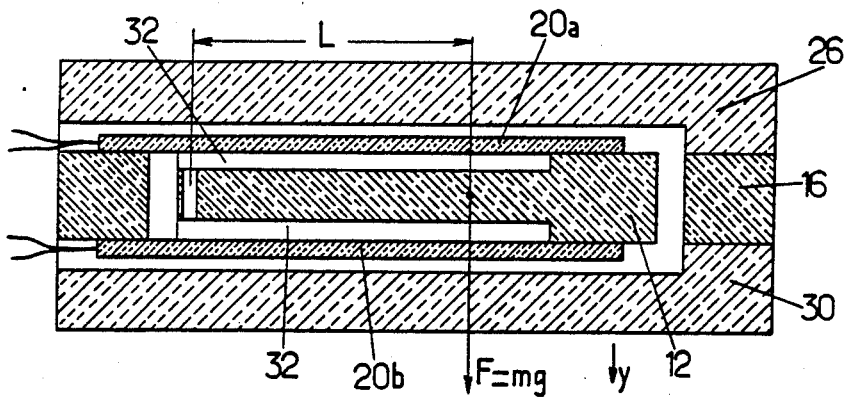
FIG. 1 is a general diagrammatic cross-sectional view of a possible construction of the mechanical part of an accelerometer according to an embodiment of the invention along line I—I of FIG. 2.
Figure 2:
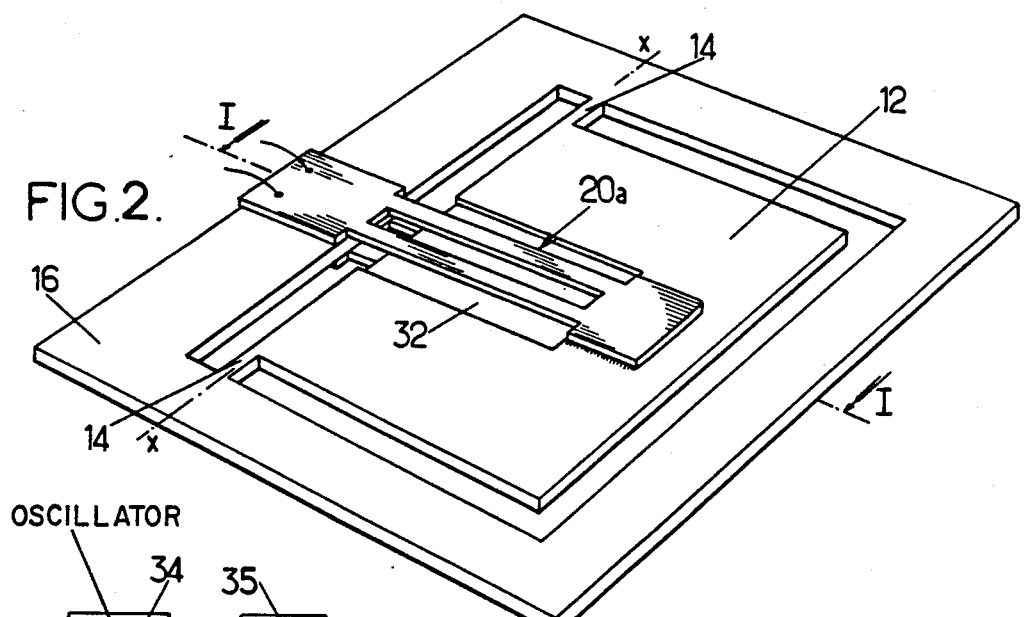
FIG. 2 is a perspective view of the median part of the accelerometer of FIG. 1, comprising the seismic mass with its sensor.
Figure 3:
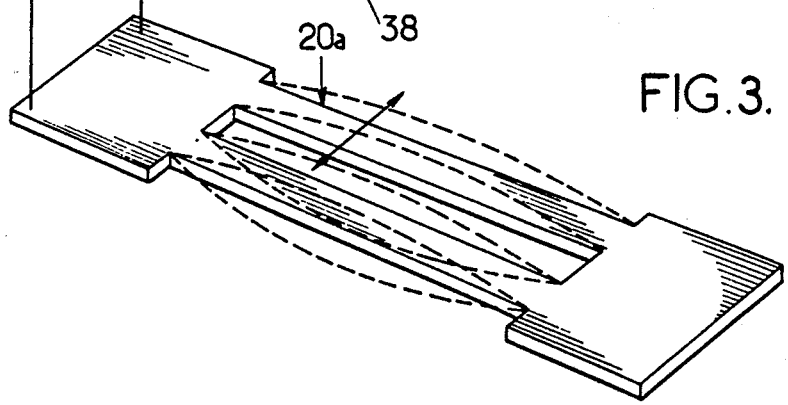
FIG. 3 is a diagram showing the general construction of a half-sensor with vibrating beams which can be used in the accelerometer of FIG. 1, and of the associated electric circuits.

The accelerometer whose general construction is shown in FIGS. 1 to 3 has the advantage of great simplicity of construction for, as will be seen, its mechanical portion is limited to three parts which may be machined collectively from quartz sections, by photolithography.

Referring to FIGS. 1 to 3, the accelerometer comprises a seismic mass 12 connected to a base 16 by two hinges forming an articulation 14 for rotation about an axis x. The detection axis is along a direction y orthogonal to x. The base belongs to a frame completely surrounding the mass and intended to be clamped between two flanged plates 26 and 30 so as to form an accelerometric cell which may be sealed.

Under the action of an acceleration g, mass 12 is again subjected to a moment with respect to the axis x equal to mgL (L being the distance between the articulation and the center of gravity of the mass). Due to the small length of the hinges, they offer practically no resistive torque to the free rotational movement of the mass. But, since they are spaced apart, they can resist to forces and shocks in direction x.

The accelerometer comprises a sensor having vibrating beams oriented perpendicularly to direction y and to the direction of articulation x, which makes it possible, as will be seen, to obtain mechanical amplification.

The sensor is formed by a pair of identical strip-shaped mutually parallel beams 20a and 20b surrounding mass 12 in the direction of the sensitive axis y. Each beam has one end fixed flat to the base 16 to constitute a securing connection. The other end is fixed flat to mass 12 to constitute another securing connection. A recess 32 formed in the mass, by chemical etching for example, allows each beam to vibrate without interfering with the mass.

In order to explain the mechanical amplification effect simply, it will first of all be assumed that the accelerometer is oriented so that the sensitive direction y is parallel to the Earth acceleration +g. The seismic mass m is then subjected, at rest, to a moment mgL=FL (L designating the distance between the center of gravity of mass 12 and the articulation axis x). This moment is balanced by the forces F which each beam exert to maintain the pendular seismic mass 12 in equilibrium. Force f is related to the acceleration g applied to the accelerometer by the relationship 2fh=mgL, h being the lever arm of the return torque, substantially equal to the half-thickness of the mass.

It can be seen that the construction provides a force amplification, of a gain equal to the ratio L/2h, which considerably increases the sensitivity of the apparatus. Due to the increased sensitivity, it is possible to substitute a low density quartz mass for the metal mass currently used at present.

Beams 20a and 20b will generally be made from quartz, which has the advantages: it has well-known and stable piezoelectric properties, it is readily available; and it can be shaped by low cost methods, such as photolithography. The beams will generally be in the shape of a blade having a thickness between 127 $\mu$m (5 mils) and 500 $\mu$m and a total length between 5 and 15 mm.

The beams may have different constructions. In the embodiment shown in FIGS. 2 and 3, each beam, 20a for example, has a double tuning fork construction of the kind described for example in US-A-3,238,789 (SERA) or 4,215,570 (EER NISSE). Each beam is associated with an oscillator 34. A circuit 35 for measuring the frequency difference, for example by beating, picks up a signal from each of the two oscillators and delivers a digital frequency differential signal at output 38. Since one of the beams is under compression when the other is under traction, the frequency shift with respect to the value at rest is doubled and in addition differential operation makes it possible to eliminate different defects, in particular those related to the thermal response of the blades and to non-linearities.

Since the two beams have substantially the same law of variation of the resonance frequency responsive to temperature and since they are situated in the immediate vicinity of each other, the influence of the temperature is practically zero, especially if the two beams have been cut out from the same quartz section.

Beams 20a and 20b may be fixed by bonding, thermocompression, composite welding or any other fixing method avoiding separation. The wires for connection with circuit 34 may be fixed to gold-coated chromium electrodes deposited on the beams by bonding with an electricity conductive bonding agent or by thermocompression.

The structure shown in FIGS. 1 and 2 is very different from that described in the above-mentioned article by Kass, since the latter has no pendular mass with a single degree of freedom (oscillation about the axis x). Because of the absence of hinge, the seismic mass acts on the two blades under any angle of application of the acceleration and error terms appear due to the dissymmetry of response of the two beams of the sensor.

The mechanical assembly which has just been described may be extremely flat and may in addition be manufactured using photolithographic methods, including the beams; that results into a very homogeneous assembly and eliminates problems of differential heat expansion.

Figure 4:
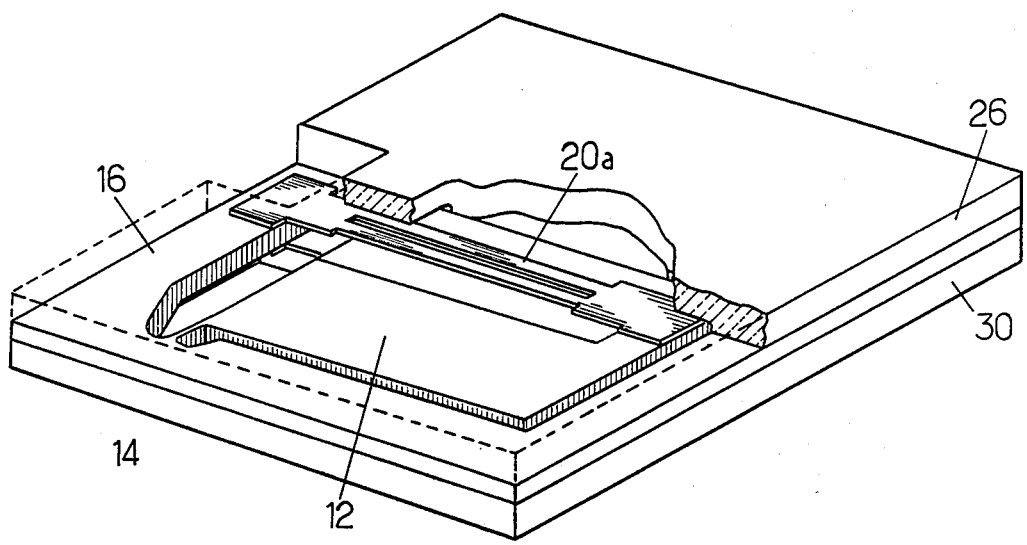
FIG. 4 shows the whole accelerometer shown in FIG. 1, in perspective view and in partial cross-section.

The mechanical portion of the accelerometer which has just been described may have the actual construction shown in FIG. 4. The two flanges 26 and 30 form a case with the frame. The central portion combining the frame and the pendular mass 12 may be machined from a quartz section. Once the beams 20a and 20b are fixed to the base and to the pendular mass, the assembly may be clamped between the two flanges and the whole may be bonded. It is very easy to machine recesses a few microns deep in the flanges by chemical machining, so as to provide the gap required for free movement of the seismic mass.

By way of example, an accelerometer of the type shown in FIG. 4 has been constructed for measuring accelerations in the range from +100 g to −100 g. The flat size was of about 7 mm×7 mm. Outside the periods of measurement, the accelerometer may withstand extreme overloads of several times 1000 g whatever the direction of the applied force, provided that the extent of possible movement e is small. A clearance e of a few microns may be readily obtained by and chemical etching. If the accelerometer comprises a sealed case containing an inert gas (helium or argon) under reduced pressure, the small clearance plays a gas-damping role and limits the amount of movement.

Figure 5:
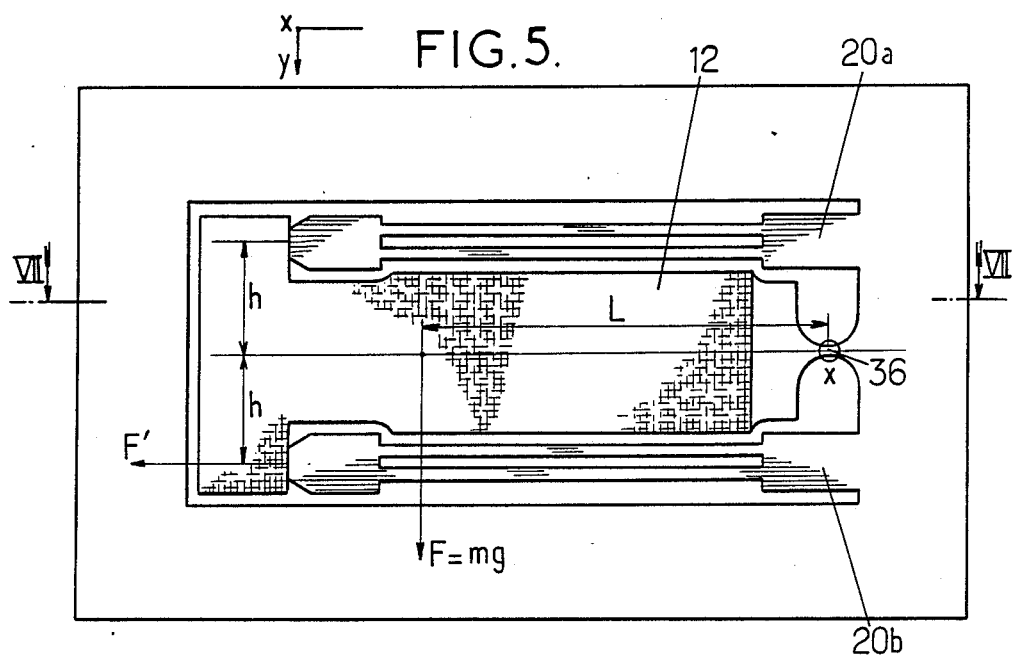
FIG. 5, similar to FIG. 1, shows another embodiment.
Figure 7:
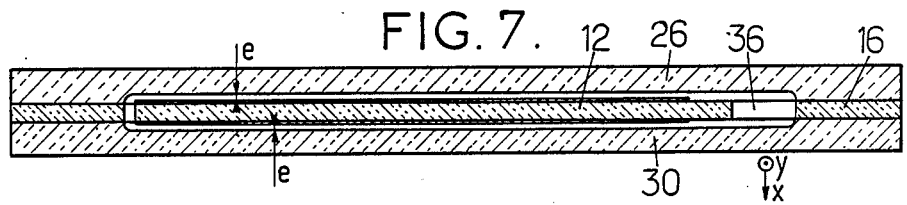
FIG. 7 is a cross-sectional view through line VII—VII of FIG. 5 showing the mechanical part of the accelerometer.
Figure 6:
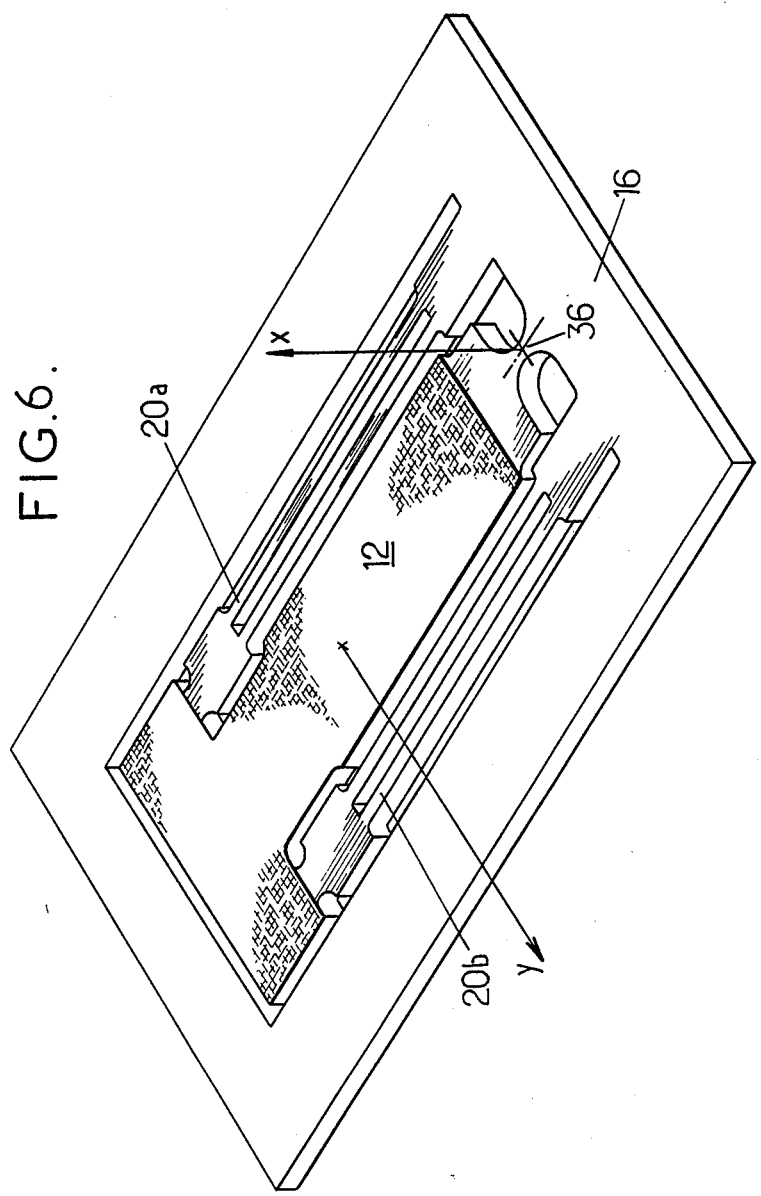
FIG. 6 is a perspective view of the central plate of the accelerometer of FIG. 5.

The embodiment shown in FIGS. 5 to 7 differs from the preceding one essentially in that the articulation axis x is perpendicular to the major faces of the flat-shaped pendular mass 12. The two beams 20a and 20b surrounding mass 12 may then be formed as a single piece with the frame comprising base 16 and with the mass 12 by cutting out a simple section of piezoelectric material, generally quartz. As shown schematically in FIGS. 5 to 7, the beams are, as in the preceding case, of the double tuning fork type. Two flanges 26 and 30 in which recesses are machined of depth e define a chamber in which the free movement in one direction or in the other of the pendular mass 12 is limited to the value e. The pendular seismic mass, in the form of a T and limited by a thinned hinge portion 36, may be made heavier by depositing heavy metal, for example by galvanic deposition of gold of from a few microns to a few tens of microns in thickness.

The construction of FIGS. 5 to 7 makes it possible to obtain an inexpensive accelerometer of extremly flat shape lending itself particularly well to use for guidance or path monitoring units in the motor vehicle industry.

Figure 8:
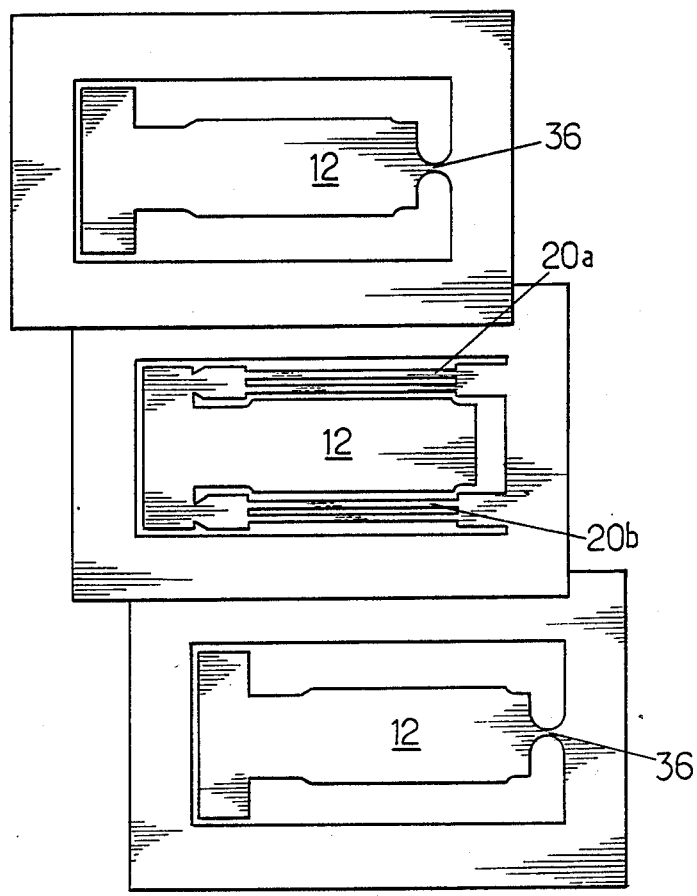
FIG. 8 is an exploded view of the active portion of a modification of FIGS. 5 to 7.

When the accelerometer is likely to be subjected to accelerations or to shocks which may cause hinge 36 to be subjected to torsional stresses, it may be advantageous to use the modification shown in FIG. 8 in exploded form. Then, the central one-piece part of FIGS. 6 to 8 is replaced with a stack of three sheets, the two end sheets being identical and carrying a mass fraction connected by a hinge 36 to a frame whereas the central fold comprises a seismic mass fraction 12 without hinge and the sensor, formed of beams 20a and 20b.

The sensors formed of double tuning fork beams described up to now may be replaced by beam sensors of a different kind for measuring tractive or compression forces. For example, it is possible to substitute, for each double tuning fork beam, a beam having two longitudinal slits as shown in European No. 0,130,705. Beam structures may also be used formed by techniques other than photolithography, such as those described in French No. 2,574,209 at least in the embodiment shown in FIGS. 4 to 7.

I claim:

1. Pendular accelerometer comprising a base, a pendular seismic mass of flat shape connected to the base by a flexure hinged connection for pivotal movement of said seismic mass about a hinge axis perpendicular to major surfaces of said pendular seismic mass, along a sense direction perpendicular to the hinge axis of the hinged connection and sensor means connecting the seismic mass to the base, wherein said sensor means comprises:

at least two vibrating beams of piezo-electric material, each connected to the base at an end thereof and to the seismic mass at the other end thereof, and each provided with electrode means for vibrating the respective beam at a tuning frequency thereof, said beams being directed orthogonally to the same axis and being located symmetrically with respect to the seismic mass on both sides of the hinge axis of the hinged connection, whereby any acceleration along the sense axis creates tractive stresses in one beam and compression stresses in the other beam, and circuit means connected to the electrodes and arranged for delivering a signal which is responsive to the difference between the resonant frequencies of the two beams when said seismic mass is subjected to an acceleration.

2. Accelerometer according to claim 1, wherein said seismic mass, said vibrating beams and said base are integral with a frame surrounding said seismic mass and said vibrating beams to constitute a flat part of constant thickness.

3. Accelerometer according to claim 1, wherein said hinge connection consists of a single hinge and wherein said two beams straddle the width of said seismic mass.

4. Accelerometer according to claim 3, wherein said beams and seismic mass constitute a unitary body obtained by machining a quartz wafer.

5. Accelerometer according to claim 1, wherein said seismic mass has a heavy metal coating.

6. Pendular accelerometer comprising:

a base;

a pendular seismic mass of flat shape connected to the base by a hinged connection for pivotal movement of said seismic mass about a hinge axis perpendicular to major surfaces of said seismic mass, along a sense direction perpendicular to the hinge axis of the hinged connection; and two vibrating beams of piezo-electric material, each connected to the base at an end thereof and to the seismic mass at the other end thereof, and each provided with electrode means for vibrating the respective beam at a tuning frequency thereof, said beams being directed orthogonally to the sense axis and being located symmetrically with respect to the seismic mass on both sides of the hinge axis of the hinged connection, whereby any acceleration along the sense axis creates tractive stresses in one beam and compression stresses in the other beam, wherein said seismic mass consists of mutually connected portions of three sheets of said piezoelectric material stacked in the direction of said hinge axis, the end ones of said sheets being formed with respective mutually aligned hinges constituting said hinge connection and the central one of said sheets being integral with said vibrating beams.

7. Accelerometer according to claim 6, wherein each of said sheets constitutes a unitary body including one of said portions and a frame surrounding the respective portion.

* * * * *